United States Patent [19]

Blackwell

[11] Patent Number: 4,626,139
[45] Date of Patent: Dec. 2, 1986

[54] ROOF BOLT ANCHOR

[76] Inventor: Russell Blackwell, 2109 Arcadia Rd., Birmingham, Ala. 35214

[21] Appl. No.: 702,794

[22] Filed: Feb. 19, 1985

[51] Int. Cl.⁴ .............................................. E21D 21/00
[52] U.S. Cl. ..................... 405/259; 411/33; 411/47; 411/67
[58] Field of Search ............... 405/259, 260, 261, 262; 411/15, 32, 33, 47, 63, 67

[56] References Cited

U.S. PATENT DOCUMENTS

| | | | |
|---|---|---|---|
| 1,367,080 | 2/1921 | Ogden | 411/33 |
| 2,783,673 | 3/1957 | Lewis et al. | 405/259 X |
| 2,950,602 | 8/1960 | Lang | 405/259 X |
| 4,147,458 | 4/1979 | Elders | 405/259 |
| 4,295,760 | 10/1981 | Warner | 405/259 |

Primary Examiner—David H. Corbin
Attorney, Agent, or Firm—Jennings, Carter, Thompson & Veal

[57] ABSTRACT

A mine roof bolt expansion anchor utilizes a plurality of transversely bent elongated leaves which are compressed within a bail by the rotation of the roof bolt. The compression results in movement of the leaves toward a flattened position whereby the outer edges of the leaves engage the bore hole walls to anchor the bolt. Downwardly extending flanges on each end of the leaves increase the bearing surface which engages the bore hole wall, while spacers near the center of the leaves act as a spine to evenly distribute the compression to all the leaves so that they all engage the bore hole wall simultaneously and with the same pressure.

11 Claims, 6 Drawing Figures

ROOF BOLT ANCHOR

BACKGROUND OF THE INVENTION

This invention relates to mine roof suspension bolt anchors and may be described as an expansion anchor for a mine roof bolt. More particularly the present invention relates to mine roof bolt anchors which employ deformable transverse members to engage an anchor bolt bore hole.

Mine roof suspension bolts have generally replaced timbers as the means for supporting the roof of a mine. These bolts are anchored within bore holes drilled into the rock strata overlaying the mine. The bolt is urged tightly against a steel roof bearing plate and the stratified rock is thereby compressed and bound together into a self-supporting laminated beam that is strong enough to support material above and around the excavation.

The obvious problem with mine roof bolts is the stability of the anchor. If the anchor slips, the self-supporting beam can be weakened and sag or fall. Therefore many attempts have been made to devise anchors which are impervious to slippages. Representative of anchors which are in some manner similar in appearance to the present invention are those shown in U.S. Pat. Nos. 1,367,080; 1,352,201; 2,950,602; 4,100,748; and 4,147,458, although some of these are not suitable for use as mine roof bolt anchors. The '080 patent and '201 patent are directed to general anchoring means and, as will be seen, are not adaptable for use as mine roof anchors. The '602, '748 and '458 patents are directed specifically to mine roof supports.

The '080 patent shows a bolt anchorage which utilizes a set of flat hard metal washers which are stacked on a bolt in alternating sequence with a plurality of transversely bent washers of soft or deformable material. The washers are compressed to distend the bent washers into engagement with the bore hole walls. This compression is achieved by either: inserting the bolt head into the bore hole in a non-rotatable manner and compressing the washers by means of a nut threaded onto the bolt, thereby leaving a portion of the bolt protruding from the hole; by impaction of the washers into the hole and then threadably engaging the washers onto the bolt; or by placing a nut in the bottom of the hole in a non-rotating manner, filling the hole with washers and inserting a bolt to compress the washers. Each instance appears to require a bore hole full of washers and does not allow further travel of the bolt; furthermore, it appears that the bent washers on the ends of the alternating series would flatten first, thereby requiring motion of the flattened washer to enable flattening of the other washers. It is readily apparent that motion of a seated washer in an expansion anchor has deleterious effects.

The '201 patent shows an expansion anchor using a plurality of curved deformable washers mounted in facing pairs with the curvature of the adjacent washers being in opposition. These washers are compressed by means such as described with regard to the '080 patent. Again, it should be noted that the end washers are apparently going to engage the bore hole walls first and must slide along the hole in order to flatten the remaining washers.

The '602 patent shows an expansion anchor which uses split rings circumscribing the roof bolt. The split rings are of two different diameters and are designed to be compressed with one size within the other to engage both the bore hole and the roof bolt. A plurality of such anchor rings may be used with each set of anchor rings separated by a metal tube which transmits forces between the upper and lower rings. This device relies on an upper nut which must non-rotatably engage the bore hole through the use of outward projections and a lower nut or stop which must advance with the bolt to compress the split rings vertically and thereby cause their lateral expansion. When the rings are fully seated the bolt cannot be advanced further due to the lower stop engaging the rings.

The '748 patent shows an expansion anchor which uses a wedge and bail supported sleeve which move responsive to the rotation of a bolt such that the sleeve is compressed between the downwardly traveling wedge and the wall of the bore hole. The primary gripping force in this type anchor has been found to exist only in the region of the sleeve that is first expanded into engagement with the wall of the bore hole.

The '458 patent shows a roof pin anchor which utilizes a plurality of resilient curved locking discs which are spaced apart by intermediate reinforcing spacers therebetween. The assemblage is forced upwardly into the bore hole. The discs are not compressed and engage the walls of the bore hole solely due to weight pulling downward on the bolt. The spacers provide reinforcement for the subjacent disc and provide a locus for the pivoting motion of the periphery of the subjacent and superjacent discs. More than one spacer element may separate the discs.

Despite the achievements and efforts involved in developing these and other anchors, the problem of slippage remains. The problem may be simplistically termed a failure to provide adequate force on the bearing surfaces engaging the walls of the bore hole. As noted with respect to the '748 and '080 patents this is primarily due to the uneven engagement of the anchor mechanism with the bore hole walls which results in decreased useful bearing surface.

SUMMARY OF THE INVENTION

It is an object of the present invention to provide an expansion anchor for a mine roof bolt that has an evenly engaging bearing surface.

Another object of the invention is to provide an expansion anchor whose total bearing surface may be increased or decreased depending on the strata within which the bolt is to be anchored.

Yet another object of the present invention is to provide an expansion anchor wherein the force exerted by its bearing surfaces is greater than the tensile strength of the associated bolt.

These and other objects of my invention are accomplished through the use of a plurality of formed leaves which extend transversely of the bore hole and which are inclined downwardly from their midpoint toward each end. At each end of the leaves a downwardly extending flange forms a bearing surface for engagement with the bore hole wall. The leaves have a central aperture through which the roof bolt extends and adjacent this aperture are a pair of vertical tabs. The leaves are held in line by a bail which extends downwardly beneath the lowermost leaf mounted on the bolt. A nut is threaded onto the bolt inside the bail and is restrained from rotation thereby such that rotation of the bolt causes the nut to descend and compress the leaves against the bail whereby they are flattened into engagement with the bore hole wall to provide anchoring for the roof bolt.

DESCRIPTION OF THE DRAWINGS

Apparatus incorporating features of my invention are depicted in the attached drawings, which forms a portion of this application, wherein.

DESCRIPTION OF A PREFERRED EMBODIMENT

Figure 1A:
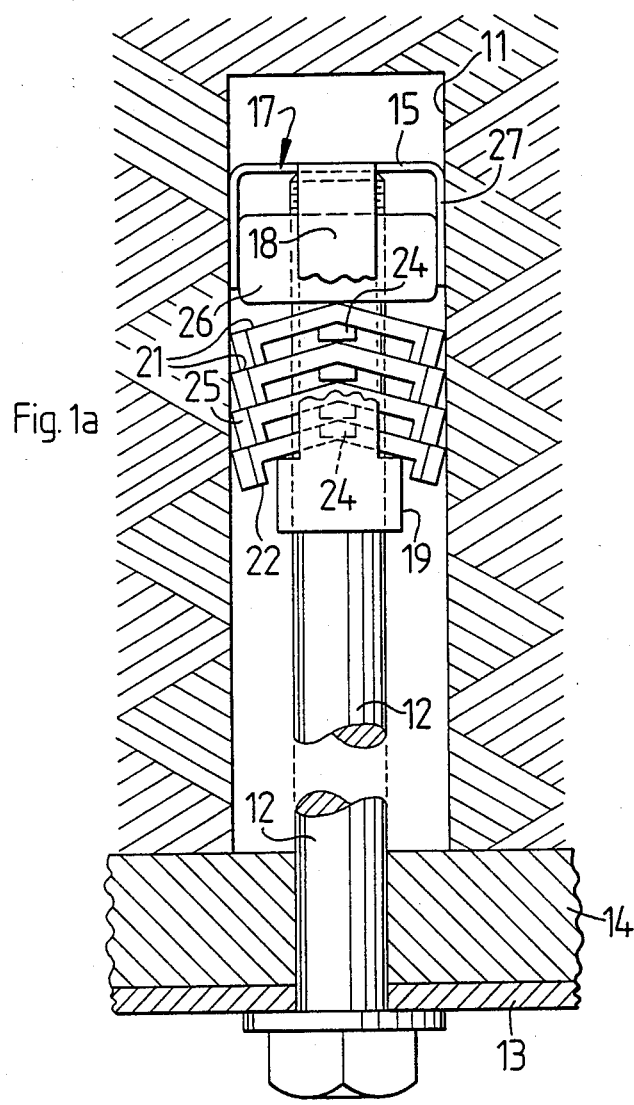
FIGS. 1a and 1b are elevational views of the anchor bolt assembly, partly broken away and in section, showing the relationship of the bail, the bolt and the leaves.
Figure 1B:
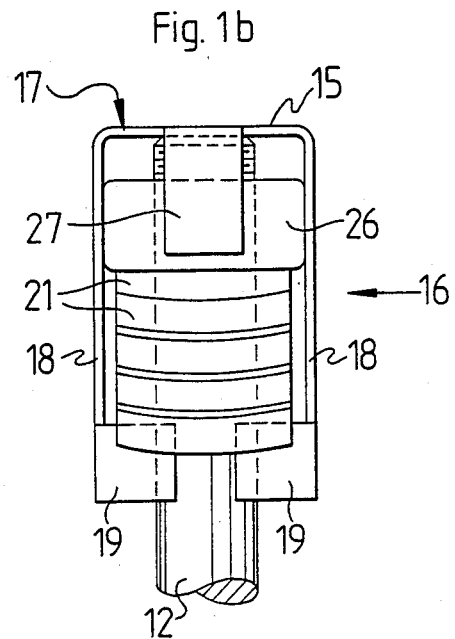
Figure 3:
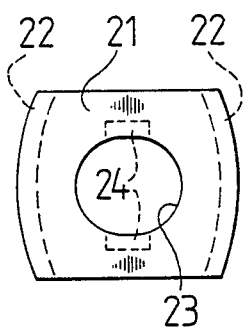
FIG. 3 is a plan view of an anchor leaf.

Referring to FIG. 1, a bore hole 11 is shown with a roof suspension bolt 12 inserted therein. Normally the shortest bolts in use are about two feet in length; however such bolts may be as long as eight to ten feet depending on the nature of the strata encountered in attempting to secure the over burden. As previously mentioned such a bolt 12 is anchored in the hole 11 to form a compressed laminated beam of rock above an excavated area. Should the anchor and bolt 12 slip under the weight of the compressed rock, the laminated beam may fall in what is termed a "local" fall which indicates a collapse of the roof coextensive with or shallower than the depth of the anchor. Unfortunately, if the anchor is slipping within the bore hole there is no perceptible motion of the roof which can be detected by unaided eye prior to the fall. Thus, a section of rock five feet square and two or more feet thick may fall from the roof without warning. More than likely if this occurs, more than one section will fall.

The bolt 12 extends upwardly and supports a roof bearing plate 13 and in some instances a wooden header beam 14. At the end of the bolt 12 inside the bore hole 11 is the anchor assembly 16 comprising my invention. The anchor assembly 16 utilizes a bail 17 which engages the end of the bolt 12 and fits snugly within the bore hole 11. The bail 17 has downwardly extending arms 18 which carry a pair of inwardly facing retainer members 19 at their lower extremities. Held between the arms 18 are a plurality of bent anchor leaves 21 each of which is an elongated metallic member, bent along a transverse line near its center. The leaves 21 are bent downwardly as much as 30° on each side. These anchor leaves 21 have down-turned flanges 22 at the outer ends thereof which define bearing surfaces 25 that are urged against the bore hole walls as hereinafter described. A central aperture 23 in each of the leaves 21 permits the anchor bolt 12 to pass therethrough. This aperture 23 is slightly oval-shaped having a longer dimension extending longitudinally of its anchor leaf 21. A pair of tabs 24 extend downwardly from each anchor leaf 21 proximal the central aperture 23. The tabs 24 and flanges 22 are of equal length such that each leaf 21 is supported on the next lower leaf on the tabs 24.

A threaded nut 26 engages the roof bolt 12 within the bail 17 so that the bail holds the nut 26 within the confines of the arms 18 and keepers 27 carried by the bail 17 to prevent the nut 26 from rotating when the bolt 12 is turned. The nut 26 is free to travel vertically along the bolt 12 in response to relative rotational motion therebetween.

In operation, a bore hole 11 is drilled in accordance with Federal safety tolerances and to a depth greater than the roof bolt 12 to be used. The bail 17, the leaves 21, and the nut 26 are positioned on the end of the bolt 12 and are urged upwards into the hole where the assemblage is held by the snug fit of the bail 17 within the bore hole 11. A hydraulic wrench or other suitable tool is then used to tighten the roof bolt 12. As the roof bolt rotates nut 26 is drawn down onto the upper leaf 21. The stack of leaves 21 is restrained from downward motion by the retainer members 19 and thus are compressed between the nut 26 and the retainer members 19. The nut 26 first contacts the upper leaf 21 near the center aperture 23 and forces it downward; however the tabs 24 are aligned above one another to act as a rigid spine to transfer this compressive force downwards so that all of the leaves 21 are constrained to move in unison. That is to say, no individual leaf 21 can be moved toward a flattened position without a corresponding movement of the remaining leaves 21. Thus, since the leaves 21 are identical they must be moved toward a flattened position to the same degree which causes all of the bearing surfaces 25 to be urged into contact with the walls of the bore hole 11 simultaneously thereby seating all of the bearing surfaces 25 of the anchor against the walls of the bore hole 11 at the same time and with the same pressure.

It should be noted that the anchor leaves 21 are not completely flattened, but rather remain slightly bent to further resist downward forces exerted by the weight of the rock or the tensioning of the bolt 12. If the leaves 21 were completely flattened, as shown in the prior art, they would be subject to further downward bending which could result in slippage.

As the leaves 21 are moved toward a flattened position and engage the walls of bore hole 11, increasingly greater force is required to urge the nut 26 downward to further flatten the leaves 21, thus greater force is exerted on the bail 17. The outward pressure exerted by the anchor leaves 21 on the surrounding strata results in an anchor strength which is several times greater than the strength of the bolt 12. For example, at 182" roof bolt is normally loaded to approximately 9000 pound linear tension, and will begin to yield or elongate at about 18,000 pounds of tension. The instant anchor is capable of placing a horizontal force on the bore hole walls which is thirty times the magnitude of the yield tension when two or more leaves are used. Thus, it is seen that the anchor assembly 16 will remain in place even though loaded with a burden greater than the strength of the bolt 12. Therefore the bolt 12 will stretch if over-stressed; however a stretched bolt may be detected within the mine, as by deformation of the bearing plate 13 or the header beam 14 whereby some warning of the dangerous condition is available.

Figure 2:
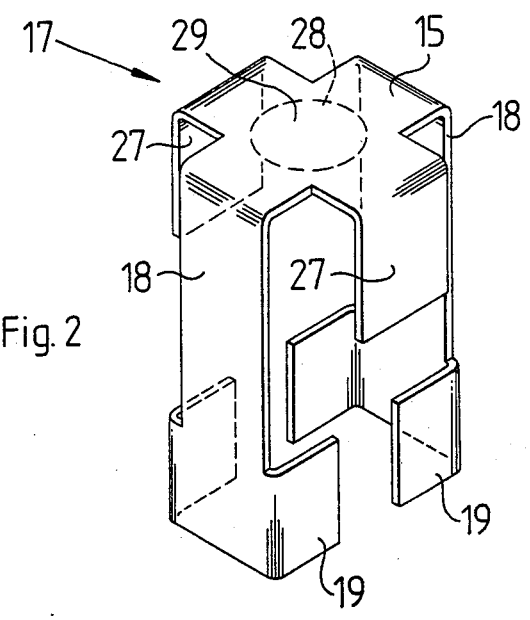
FIG. 2 is a perspective view of the bail.
Figure 4:
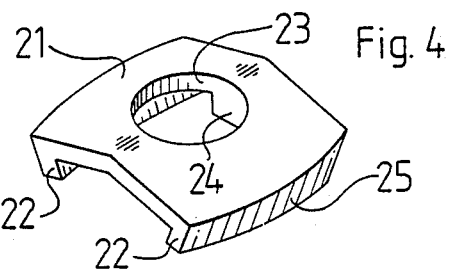
FIG. 4 is a perspective view of an anchor leaf.
Figure 5:
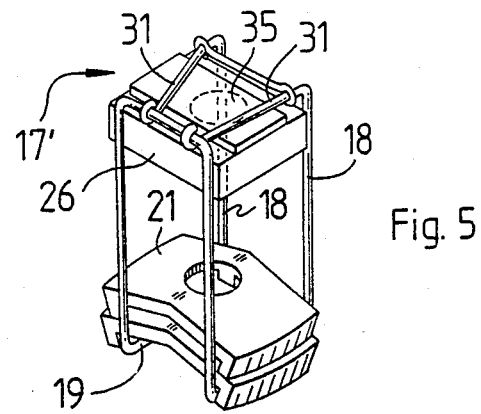
FIG. 5 is a perspective view of an alternate embodiment utilizing a wire bail.

The bail 17 is designed to yield or open when the desired anchor forces are reached. This means simply that at a predetermined point more force is required to urge the nut 26 and leaves 21 downwardly than is required for the bolt 12 to penetrate the upper portion 15 of the bail 17. Thus, further rotation of the bolt 12 does not further compress the leaves 21 but rather allows the bolt to travel upwardly within the bore hole 11 and be tensioned against the bearing plate 13 at the roof surface. The bail 17 may be formed from flat metal, as shown in FIGS. 1 and 2, or may be in the form of a bail 17' having a wire-like structure, as shown in FIG. 5. The flat metal bail 17 may be stamped from stock sheet metal and thereafter formed about the leaves 21 and nut 26. The top of the bail 17 is partially cut through as at 28 to define a disc 29 which will yield when sufficient force is applied thereto by bolt 12. The wire-like bail 17' is formed with a metallic flap 35 therebetween such that the upper wires 31 engaging the end of bolt 12 will separate upon the application of a predetermined force to allow bolt 12 to travel upwardly in the bore hole 11.

The leaves 21 may also be stamped from suitable sheetmetal such that the tabs 24 are formed integrally with the leaves 21. The flanges 22 and tabs 24 are turned downward and the leaves 21 are bent about a central transverse line as described above. When so bent the leaves 21 are slightly shorter longitudinally than the bore hole 11 is wide. However upon moving the leaves toward a flattened position, the leaves 21 are longer than the transverse width of the bore hole 11; thus the flanges 22 are urged against the walls of the bore hole 11. By way of illustration, the sheet metal from which the leaves 21 are formed may be from 1/16" to 5/16" thick; the tabs 24 and flanges 22 may extend downwardly from ⅛" to ¾"; and each lateral surface of the leaves may slope downwardly as much as 30° from the horizontal prior to movement toward a flattened position. The number and size of the leaves 21 utilized is dependent upon the strata within which the anchor must seat and the total bearing surface desired.

While I have shown my invention in several forms, it will be obvious to those skilled in the art that it is not so limited, but is susceptible of various other changes and modifications without departing from the spirit thereof.

What I claim is:

1. An anchor for a mine roof bolt for use in a preformed bore hole comprising, in combination:
   (a) a plurality of elongated leaves each having a central aperture for receiving said bolt therethrough with said leaves being transversely bent proximal said central aperture such that said leaves extend less than said bore hole diameter and being stacked vertically on said bolt;
   (b) means for compressing said leaves proximal and parallel to said bolt in response to rotation of said bolt such that said leaves are moved toward a flattened position such that said leaves are urged into engagement with said bore hole's walls; and
   (c) means intermediate said leaves proximal said central apertures for distributing the compressive forces generated by said compressing means evenly among the bent leaves to cause equal and simultaneous engagement of the leaves with said bore hole walls.

2. An anchor for a mine roof bolt for use in a preformed bore hole comprising, in combination:
   (a) a plurality of elongated leaves each having a central aperture for receiving said bolt therethrough with said leaves being transversely bent proximal said central aperture and being stacked vertically on said bolt;
   (b) means for compressing said leaves in response to rotation of said bolt such that said leaves are moved toward a flattened position and urged into engagement with said bore hole's walls comprising,
      (i) a bail having an upper member extending transversely of and engaged by said bolt, opposing arm members depending from said upper member with said stacked leaves positioned between said arm members, and retainer members carried by said arm members and extending perpendicular thereto and engaging said stacked leaves adjacent the bottom thereof,
      (ii) a nut non-rotatably mounted within said bail above said stacked leaves and threadedly engaged by said bolt, such that said nut moves vertically responsive to rotation of said bolt; and
   (c) means intermediate said leaves proximal said central apertures for distributing the compressive forces generated by said compressing means evenly among the bent leaves to cause equal and simultaneous engagement of the leaves with said bore hole walls.

3. The anchor as defined in claim 2 wherein said curved end portions extend downwardly to form bearing surfaces for engagement with said bore hole walls.

4. The anchor as defined in claim 3 wherein said bearing surfaces are urged against said bore hole such that the force necessary to dislodge said bearing surfaces therefrom exceeds the strength of said bolt.

5. The anchor defined in claim 2 wherein said bail is made of a wire-like metallic material looped about said nut and said leaves to form said upper member, arm members and said retainer members.

6. The anchor defined in claim 2 wherein said bail is stamped from sheet metal and formed into said upper member, arm members, and said retainer members.

7. The anchor defined in claim 2 wherein said bail fits snugly and non-rotatably within said bore hole.

8. The anchor defined in claim 2 wherein said upper member has a displaceable section through which said bolt may advance subsequent to a predetermined compression of said leaves.

9. The anchor defined in claim 2 wherein said means for distributing compressive forces comprises: opposing downwardly extending tabs adjacent each of said central apertures with said tabs providing contact between adjacent leaves proximal said bolt.

10. Apparatus for anchoring a mine roof support bolt within a bore hole comprising:
    (a) a plurality of elongated leaves mounted on said bolt and extending transversely of said bore hole, with said leaves being inclined downwardly on opposite sides of said bolt and being spaced apart by rigid connectors therebetween;
    (b) bail means for holding said leaves in vertical and angular relation to each other on said bolt including a metallic bail having an upper portion transverse said bore hole and engaged by said bolt, vertically depending arms extending from said upper portions, and transverse retainer members carried by said arms, with said leaves retained within said arms and supported by said retainer members; and
    (c) compression means responsive to the rotation of said bolt for urging said leaves downward against said bail means, including a nut threadedly engaged by said bolt and non-rotatably held within said bail whereby said leaves are compressed between said retainer members and said nut upon rotation of said bolt, thus the inclination of said leaves is concomitantly reduced and said leaves simultaneously engage the side of said bore hole.

11. Apparatus as defined in claim 10 wherein said elongated leaves have a central aperture for receiving said bolt therethrough, and also have opposed downturned flanges depending from the ends thereof and rigid spacer elements proximal said central aperture defining said rigid connectors.

* * * * *